United States Patent
Murakami et al.

[11] Patent Number: 5,820,811
[45] Date of Patent: Oct. 13, 1998

[54] OPTICAL MOLDING PROCESS

[75] Inventors: Tamotsu Murakami, Tokyo; Naomasa Nakajima, Chofu; Yuichiro Nakaya, Higashimurayama; Taro Takagi, Hitachi, all of Japan

[73] Assignee: Japan Synthetic Rubber Co., Ltd., Tokyo, Japan

[21] Appl. No.: 674,915

[22] Filed: Jul. 3, 1996

[30] Foreign Application Priority Data

Jul. 6, 1995 [JP] Japan ................................. 7-170650

[51] Int. Cl.$^6$ ........................... B29C 35/08; B29C 41/02
[52] U.S. Cl. ...................... 264/401; 264/162; 264/237; 264/308
[58] Field of Search ............................. 264/162, 237, 264/308, 401

[56] References Cited

U.S. PATENT DOCUMENTS 4,961,154  10/1990  Pomerantz et al. ............. 264/401 X
5,386,500   1/1995  Pomerantz et al. ............. 264/401 X

FOREIGN PATENT DOCUMENTS

56-144478  11/1981  Japan .
2-78531    3/1990  Japan .

Primary Examiner—Leo B. Tentoni
Attorney, Agent, or Firm—Oblon, Spivak, McClelland, Maier & Neustadt, P.C.

[57] ABSTRACT

A novel optical molding process for forming a three-dimensional article from a photosensitive resin which is liquid at normal temperatures which involves forming a plurality of laminated cured resin layers by a repetition of the step of forming a cured resin layer by selectively irradiating the surface of a photosensitive resin, wherein the photosensitive resin has been coagulated by cooling and the coagulated resin is irradiated to cure it. The process can produce a three-dimensional article having an overhanging part without producing warping in the finished product and without requiring a support for the overhanging part while this part is being optically molded.

5 Claims, 8 Drawing Sheets

OPTICAL MOLDING PROCESS

BACKGROUND OF THE INVENTION

1. Field of the Invention

The present invention relates to an optical molding process for producing three-dimensional articles from a photosensitive resin composition.

2. Discussion of the Background

An optical molding process for molding a three dimensional article consisting of a plurality of layers of a cured resin made from an image forming material is known in recent years. The process comprises a repetition of a step for forming a cured resin layer by selectively irradiating a surface of a photosensitive resin composition (hereinafter from time to time referred to simply as photosensitive resin) used as the image forming material. One of the processes for optically molding such a photosensitive resin composition which has been heretofore proposed comprises preparing a plurality of slices of a desired a three-dimensional shape (slice shape data) to be molded using a computer, selectively irradiating the surface of the photosensitive resin composition with radiation such as that from UV laser according to the slice shape data to polymerize and cure the resin, thus obtaining a cured resin layer. The process of forming such a cured resin layer is repeated to put a plurality of resin layers one on another.

Japanese Patent Application Laid-Open (kokai) No. 144478/1981, for example, discloses a process which comprises placing a liquid photosensitive resin in a container, selectively irradiating the surface of the photosensitive resin while causing a light exposure means installed above the container to scan, thereby forming a cured resin layer, supplying the liquid photosensitive resin in a quantity sufficient to produce one layer of the resin, selectively irradiating the surface of this new resin layer to form a newly cured resin layer continuously on the previously formed cured resin layer, thereby obtaining integrally laminated resin layers, and repeating the supply of photosensitive resin and irradiation for a prescribed number of times while changing or not changing the irradiating pattern.

As a method for selectively irradiating the surface of a photosensitive resin, Japanese Patent Application Laid-Open (kokai) No. 78531/1990 discloses a method of exposing a surface to light through a mask which selectively permits the light to pass therethrough.

There are, however, the following problems in conventional processes using a liquid photosensitive resin composition.

(1) In the molding of a three-dimensional article with an overhanging part which outwardly projects upward, a part of a cured (solid) resin layer must be formed on a liquid photosensitive resin. Because said solid part of resin cannot be sufficiently supported by the liquid photosensitive resin composition, deformation such as warping may be produced in the overhanging portion of the molded three-dimensional article.

Figure 1:
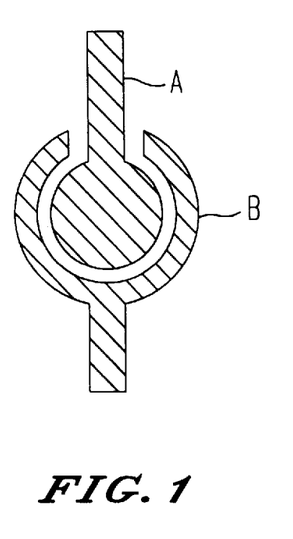
FIG. 1 is a cross-sectional view showing a three-dimensional article consisting of two separate parts A and B which are not continuous in the vertical direction.

(2) In the molding of a three-dimensional article consisting of two or more parts which are not continuous (e.g. an article separated in the vertical direction into a part A and a part B as shown in FIG. 1), cured (solid) resin layers which form the upper part A must be formed on a liquid photosensitive resin. Because the liquid photosensitive resin cannot adequately support the cured solid resin layers forming the part A, the cured resin layers of the part A float or sink in the liquid photosensitive resin composition in the course of the molding operation. The resulting molded article A does not have the desired shape reflecting the data for the shape of the slice (slice shape data).

(3) Conventional liquid photosensitive resins exhibit a comparatively large cure shrinkage. Because it is difficult to accurately adjust dimensions taking the cure shrinkage into account, the dimensional precision of the resulting molded article can be only limitedly improved.

(4) In the conventional optical molding process using a free liquid surface method, the minimum thickness of a resin layer (lamination pitch) for forming cured resin layers is about 10–30 $\mu$m or greater, because this thickness is affected by surface tension and the like. The conventional optical molding process therefore cannot be applied to molding of precision parts such as micro-machines.

To provide a support member such as a column which supports the overhanging part from below is conceivable for overcoming the problem (1). As a solution of the problem (2), the provision of a linkage which connects the lower part (part B) and the upper part (part A) may be proposed.

However, such a support and linkage can be designed only with difficulty requiring considerable experience and skill. In addition, this support or linkage must be removed by means of an additional step after completion of the optical molding process.

The present invention has been completed in view of these situations and has a first object of providing a novel process for optically molding three-dimensional articles from a photosensitive resin composition which is liquid at normal temperatures.

A second object of the present invention is to provide a process for optically molding a three-dimensional article having an overhanging part without producing warping or the like in the finished product without requiring a support for the overhanging part while this part is being optically molded.

A third object of the present invention is to provide a process for optically molding a three-dimensional article consisting of two or more parts which are not continuous in the vertical direction, while adequately supporting the upper parts without requiring a linkage to connect these parts, producing all parts making up the molded article with a desired shape reflecting the slice-shape data.

A fourth object is to provide a process for optically molding a three-dimensional article requiring high dimensional precision.

A fifth object is to provide a process for optically molding a three-dimensional article which can be applied for the manufacture of high precision parts such as micro-machines.

SUMMARY OF THE INVENTION

The above objects can be achieved in the present invention by an optical molding process comprising repeating a step for forming a cured resin layer to put a plurality of laminated cured resin layers by selectively irradiating the surface of a photosensitive resin composition, which is characterized by comprising a step of cooling the photosensitive resin composition to cause it to coagulate, and then irradiating the coagulated resin composition with light.

In a preferred embodiment, the optical molding process of the present invention further comprises a step (A) for forming a layer (n+1) of a liquid photosensitive resin composition by supplying the resin composition to the surface of a resin layer n consisting of cooled, coagulated photosensitive resin composition and the surface of a cured resin layer n formed by irradiating at least a part of the coagulated photosensitive resin composition, a step (B) for cooling the photosensitive resin composition of the layer (n+1) to coagulate the resin, and a step (C) for selectively irradiating the surface of the coagulated photosensitive resin composition of the layer (n+1) to produce a cured resin layer (n+1).

In another preferred embodiment, the above optical molding process further comprises a step of cutting the surface of coagulated photosensitive resin of the layer (n+1) produced by the step (B) to reduce the thickness of the layer (n+1).

In still another preferred embodiment, the above optical molding process further comprises a step of cutting the surface of coagulated photosensitive resin of the layer (n+1) and the surface of cured photosensitive resin of the layer (n+1) produced by the step (C) to reduce the thickness of these layers.

Another object of the present invention is to provide an optical molding apparatus equipped with a cooling means for use in the optical molding process for forming a three-dimensional article comprising forming a plurality of laminated cured resin layers by repeatedly forming a cured resin layer by selectively irradiating the surface of a photosensitive resin composition, which process is characterized by further comprising a step of cooling the photosensitive resin composition to cause it to coagulate, then irradiating the coagulated resin composition with light.

Still another object of the present invention is to provide a three-dimensional molded article produced by an optical molding process comprising forming a plurality of laminated cured resin layers by repeatedly forming a cured resin layer by selectively irradiating the surface of a photosensitive resin composition, which process is characterized by further comprising a step of cooling the photosensitive resin composition to cause it to coagulate, then irradiating the coagulated resin composition with light.

Other objects, features and advantages of the invention will hereinafter become more readily apparent from the following description.

BRIEF DESCRIPTION OF THE DRAWINGS

FIG. 7 is a diagram for illustrating the three-dimensional article designed in the Experiment hereinafter.

DETAILED DESCRIPTION OF THE INVENTION AND PREFERRED EMBODIMENTS

<Optical molding apparatus>

Figure 2:
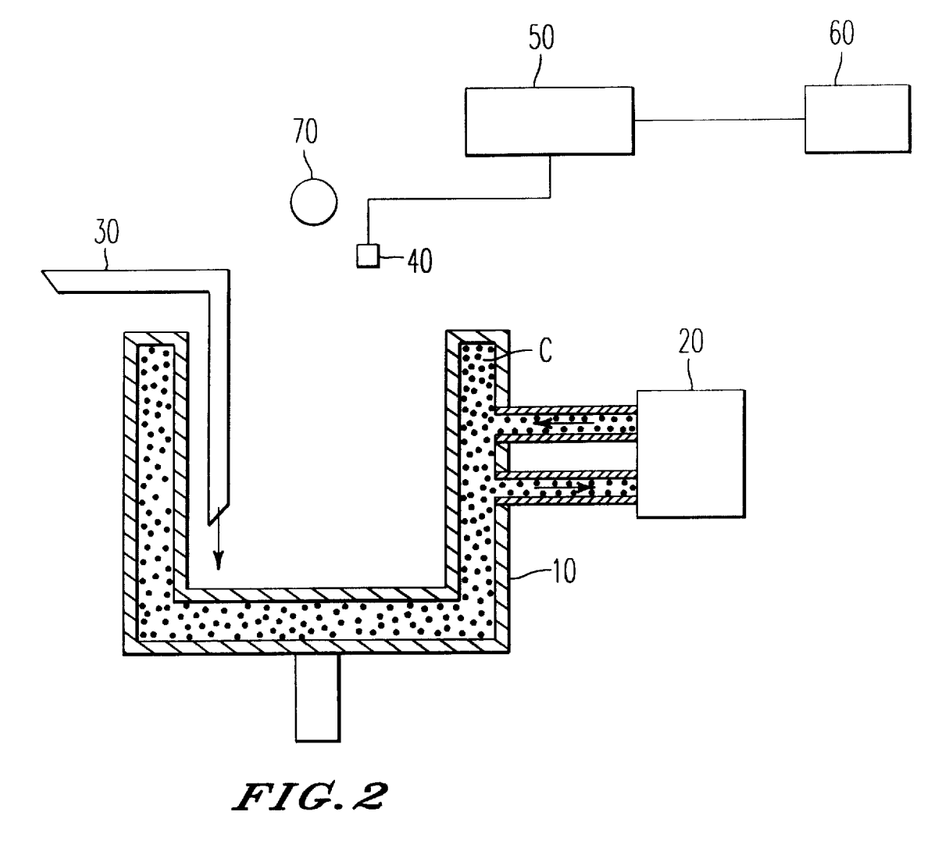
FIG. 2 shows an outline of an embodiment of the optical molding apparatus used in the optical molding process of the present invention.

FIG. 2 is a drawing showing an outline of a typical optical molding apparatus used for implementing the optical molding process of the present invention. In FIG. 1, a jacketed resin container 10 is designed to be cooled by a cooling medium C circulated from a cooler 20 through the jacket. A photosensitive resin composition is supplied to the resin container 10 from a resin supply means 30, which may be a sprayer or a curtain coater with slit openings, but not limited to these. A photosensitive resin composition in an amount corresponding to one layer of the resin in the container 10 is supplied by the resin supply means 30.

The photosensitive resin supplied to the resin container 10 is irradiated with light from a light source 40 which may be, for example, a UV laser emission device such as a helium-cadmium laser, argon laser, or semi-conductor laser, a krypton long arc lamp, a xenon long arc lamp, a metal halide long arc lamp, or a mercury long arc lamp. The numeral 50 indicates a control means, and 60 denotes a data file. In optical molding, the control means calls slice-shape data of the target article to be molded from the data file 60 and controls the light source 40 by causing the light source to scan according to the slice-shape data so as to selectively irradiate the surface of the photosensitive resin composition.

A heating means 70, which may be an IR heater lamp, for example, is installed as required. The curing strength of molded articles produced by the optical molding process can be improved by a heat treatment using the heating means 70. An irradiation means for post curing may be provided instead of the heating means 70 to irradiate the articles produced by the optical molding process.

<Optical molding process>

An embodiment of the optical process of the present invention will now be specifically illustrated with reference to FIGS. 3 to 6 which diagrammatically show each step of the optical molding process of the present invention.

<Optical molding steps>

(1) Formation of a cured resin layer 1 (first layer)

Figure 3A:
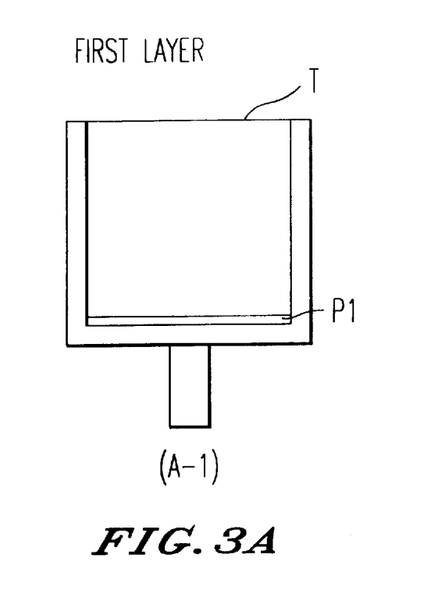
FIG. 3 is a diagram for illustrating steps for forming a first layer (layer 1) in the optical molding process of the present invention.
Figure 3B:
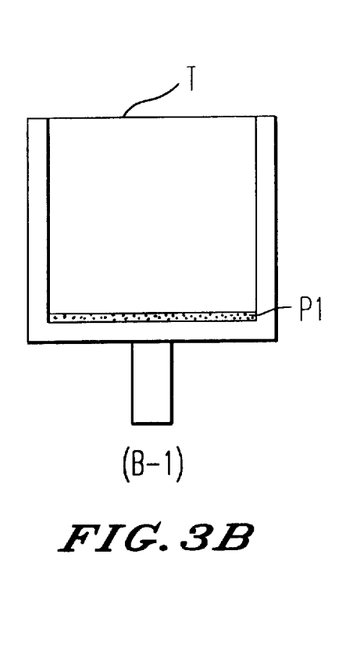
Figure 3C:
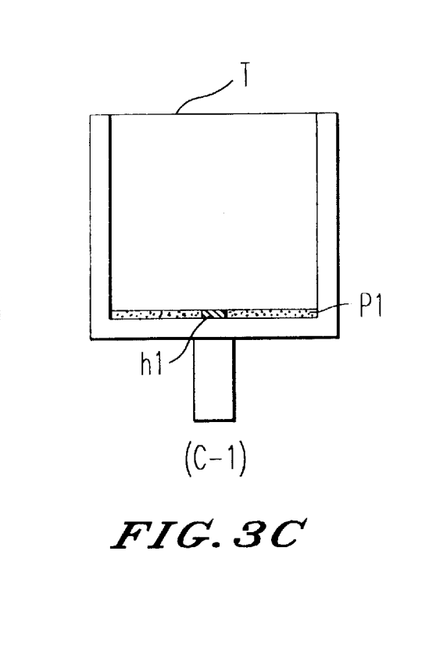

① As shown in (A-1) in FIG. 3, a photosensitive resin composition in an amount corresponding to one layer of the resin is supplied to the resin container T by means of a resin supply means (omitted from the drawing). A first resin layer p1 of liquid photosensitive resin composition is formed on the horizontal bottom of the container. Here, various methods can be used for supplying the resin to the container with no specific limitation. Typical methods include a method for coating the liquid resin using nozzles; a method for spraying the liquid resin by means of a sprayer; a method comprising placing the resin in the form of a film with no fluidity by cooling below the coagulation point on the bottom of the resin container, then pressing the resin film with a plate at a temperature above the coagulation point to melt the resin; and a method comprising placing the resin in the form of a powder with no fluidity by cooling below the coagulation point on the bottom of the resin container, then pressing the resin film with a plate at a temperature above the coagulation point to melt the resin.

② Next, the photosensitive resin composition of the layer p1 is coagulated by cooling below the coagulation point as shown in (B-1) in FIG. 3. There are no specific limitations to the method for cooling the photosensitive resin composition and the apparatus used therefor. Typical examples include a method of using a jacketed resin container, whereby the resin is indirectly cooled by a cooling medium circulated through the jacket; a method of placing a rod-shaped cooling device in the resin container to directly cool the resin contained therein; and a method of spraying a cooling gas (e.g. nitrogen gas, preferably dry gas to prevent dewing on the surface of resin layer) to the photosensitive resin composition to directly cool the resin. The cooling of the photosensitive resin should be constantly performed during the optical molding process.

③ Then, a selected area of the photosensitive resin composition of the layer p1 is irradiated by means of irradiation means (not shown in the drawings) to form a first cured resin layer h1, as shown in (C-1) of FIG. 3. The types of light for irradiating the surface of the resin layer vary depending on the types of photosensitive resin. Infrared light, ultraviolet light, and ultraviolet laser are given as examples. The use of the ultraviolet laser is particularly preferred because the irradiated surface is locally heated to accelerate photo-curing.

(2) Formation of a cured resin layer 2 (second layer)

Figure 4A:
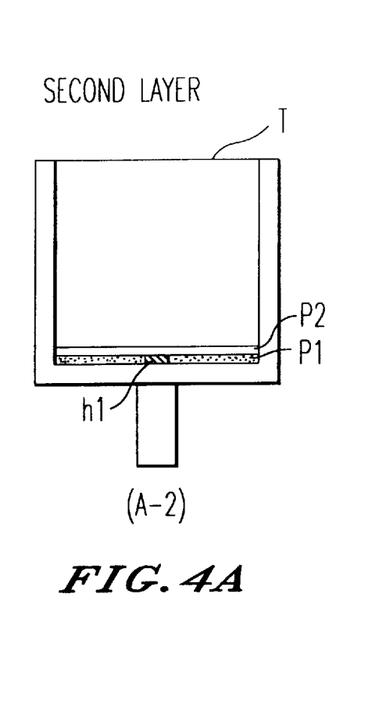
FIG. 4 is a diagram for illustrating steps for forming a second layer (layer 2) in the optical molding process of the present invention.
Figure 4B:
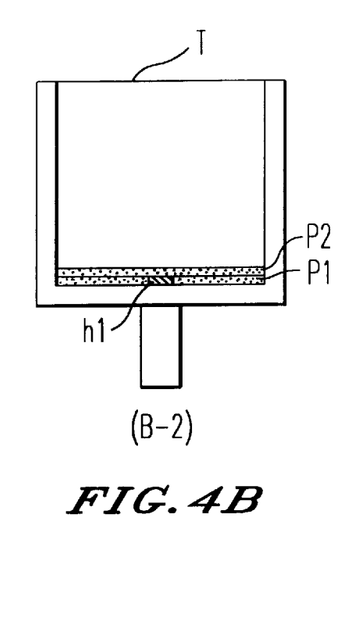
Figure 4C:
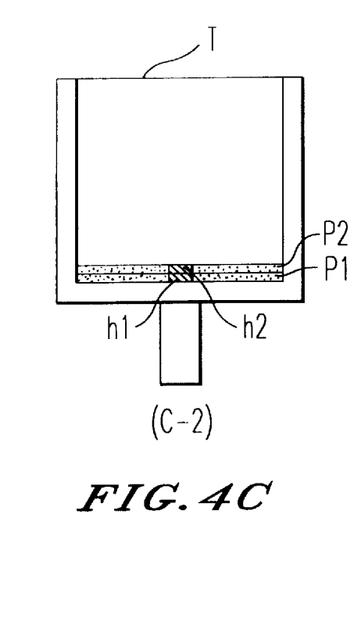

① A photosensitive resin composition in an amount corresponding to one layer of the resin is supplied to the resin container T by means of a resin supply means to form a second resin layer p2 of liquid photosensitive resin composition on the surfaces of the first resin layer p1 and the cured resin layer h1, as shown in (A-2) of FIG. 4. Either the same method as used for supplying the resin of the first layer or a different method can be used for supplying the photosensitive resin composition. Further, in order to prevent formation of excess cured materials in layers below the overhanging part, it is possible to provide a light shielding layer containing a coloring matter or a light absorbing material between the first layer and the second layer. The same method as the method for supplying the photosensitive resin can be used for supplying the resin for forming this light shielding layer.

② The photosensitive resin composition of the layer p2 is coagulated by cooling below the coagulation point as shown in (B-2) of FIG. 4. Either the same method as used for cooling the photosensitive resin of the first layer or a different method can be used for cooling the photosensitive resin composition of this layer.

③ A selected area of the photosensitive resin composition of the layer p2 is irradiated by means of irradiation means to form a second cured resin layer h2, as shown in (C-2) of FIG. 4. The type of light and the method for irradiating the surface of the resin layer p2 may be the same as that used for irradiating the layer p1 or a different type of light and the method may be used.

(3) Formation of a cured resin layer (n+1)

Figure 5A:
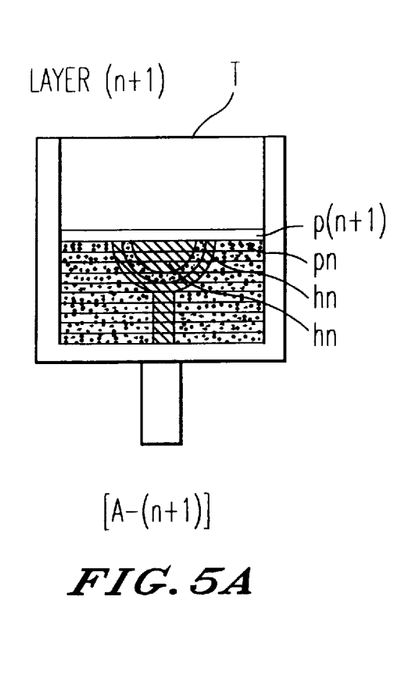
FIG. 5 is a diagram for illustrating steps for forming a layer (n+1) in the optical molding process of the present invention.
Figure 5B:
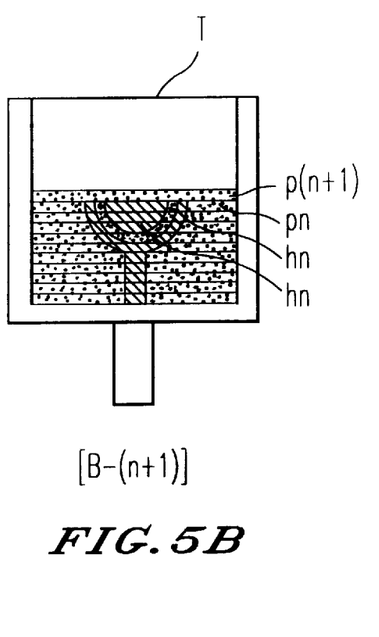
Figure 5C:
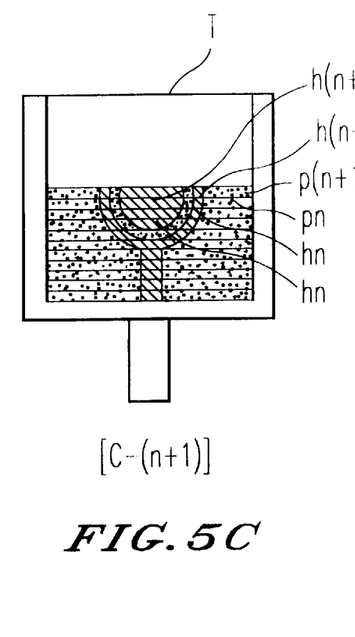

① A photosensitive resin composition in an amount corresponding to one layer of the resin is supplied to the resin container T by means of a resin supply means to form a resin layer p(n+1) of liquid photosensitive resin composition on the surfaces of the resin layer pn and the cured resin layer hn, as shown in [A- (n+1)] of FIG. 5. In this resin supplying step (Step [A]), either the same method as used for supplying the resin of the layers p1 to pn or a different method can be used for supplying the photosensitive resin composition. It is possible to provide the above-mentioned light shielding layer between the layer n and the layer (n+1).

② The photosensitive resin composition of the layer p(n+1) is coagulated by cooling below the coagulation point as shown in [B-(n+1)] of FIG. 5. In this resin layer cooling stem (Step [B]), either the same method as used for cooling the photosensitive resin of the layers p1 to pn or a different method can be used for cooling the photosensitive resin composition of this layer.

③ A selected area of the photosensitive resin composition of the layer p(n+1) is irradiated by means of irradiation means to form a cured resin layer h(n+1), as shown in [(C-(n+1)] of FIG. 5. In this irradiation step (Step [C]), the type of light and the method for irradiating the surface of the resin layer p(N+1) may be the same as that used for irradiating the layers p1 to pn or a different type of light and the method may be used.

Figure 6A:
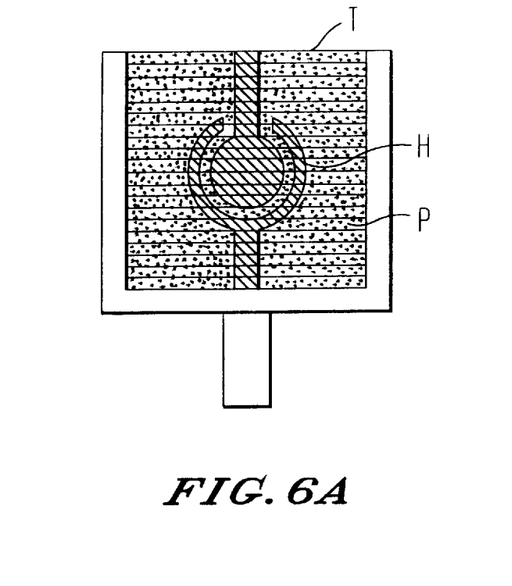
FIG. 6 is a diagram for illustrating the final steps in the optical molding process of the present invention showing a molded article as formed (1) before and (2) after removal of the coagulated resin composition.
Figure 6B:
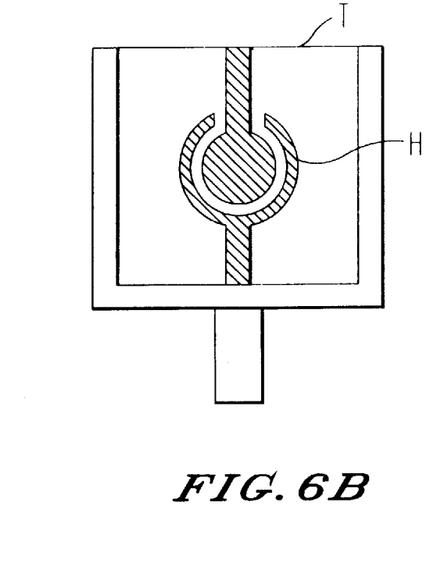

A three-dimensional article H made of a plurality of laminated cured resin layers, shown in FIG. 6 (1), is formed in coagulated photosensitive resin P by repeating the Step [A] to Step [C] mentioned above.

<Melting and removing of the photosensitive resin>

After completion of the optical molding process, the photosensitive resin surrounding the molded article H is melted and removed. Termination of the cooling operation which has been used during the optical molding process, such as terminating circulation of the cooling medium in the jacket, usually causes the photosensitive resin to melt. It is possible to heat the photosensitive resin to melt it more quickly. The melted photosensitive resin is discharged from an exhaust opening (not shown in the drawing) provided in the bottom of the resin container T, leaving only the molded article H in the container T, as shown in FIG. 6 (2).

<Washing Step>

The molded article is washed, if required, after melting and removal of the photosensitive resin. Flushing, water jet, shower, shaking in liquid, and ultrasonic treatment are given as examples of the washing method used here. The washing may be carried out either in the resin container using a washing machine installed in the optical molding apparatus or after the molded article has been removed from the resin container. The washing medium should be a liquid which can dissolve the photosensitive resin without changing the cured resin (the polymerized cured product). Water or various types of washing media, such as an acidic aqueous solution, an alkaline aqueous solution, or an organic solvent, may be used depending on the type of the photosensitive resin.

<Post cure treatment step>

After completion of the melting and removal step for the photosensitive resin or the washing step, a post cure treatment of the molded article is carried out as required. This treatment can increase the cure strength of the product. A heat treatment using a heating means (such as the heating means 70 in FIG. 2) and a photo-irradiation treatment using a UV lamp or the like can be given as the method for the post cure treatment.

<Surface cutting step of photosensitive resin>

A three-dimensional molded article made up of a plurality of laminated layers of resin can be obtained by the process of the present invention after repetition of the resin supplying step [A], the resin layer cooling step [B], and the irradiation step [C]. It is desirable to add a step for cutting the surface of the coagulated resin layer (N+1) after the resin layer cooling step [B]. This step makes it possible to form a resin layer with a thickness less than the minimum resin thickness (e.g. 10–30 $\mu$m) which can be produced in a free liquid surface method for optical molding, whereby the lamination pitch of cured resin making up the molded article can be decreased to as small as, for example, 10 $\mu$m or less. As a result, the process is well adaptable for the molding of precision parts such as for a micro-machine.

It is also possible to obtain molded articles with a small lamination pitch which can be used for molding precision parts by cutting the surface of the resin layer (n+1) and the surface of the cured resin layer (n+1) after the irradiation step [C].

Any optional cutting means, such as surface grinding using a grinder, can be used for the surface cutting.

<Photosensitive resin>

The photosensitive resin composition used in the optical molding process of the present invention (1) must be fluid at normal temperatures (20°–40° C.), lose fluidity and coagulate when cooled, specifically should have a coagulation point of lower than 20° C., preferably lower than 10° C.; and (2) must be polymerized and cured by low temperature irradiation conditions.

In addition, it is desirable that the photosensitive resin composition used in the present invention exhibit low heat of coagulation (heat of melting), produce cured products with excellent chemical resistance (resistance to washing media), superior mechanical characteristics, and superb processability, exhibiting minimal deformation or changes in mechanical characteristics over time.

Because the photosensitive resin composition used in the present invention is fluid at normal temperatures (20°–40° C.), the treatment to remove uncured resin (development treatment) after optical molding can be carried out with great ease as compared with a composition which is a solid (film) or a gel at normal temperatures.

Given as examples of the components which make up the photosensitive resin composition used in the present invention are polymers containing a photosensitive group(s), photocurable monomers, photopolymerization initiators, photosensitizers, solvents, various additives, and fillers. The compositions given in (1)–(15) below, which may include photopolymerization initiators as required in addition to the given components, are examples of typical photosensitive resin compositions used in the present invention.

(1) A mixture of at least one polymer selected from polyester, polyurethane, epoxy, polyether, polycarbonate, and polyamide having two or more acrylic double bonds in a molecule, and a photocurable monomer typified by a mono-functional or poly-functional (meth)acrylate compound.

(2) A mixture of a polymer, such as a polyvinyl alcohol soluble in water or hot water which is provided with photocurability, and a photocurable monomer.

(3) A mixture of a polymer such as cellulose acetate-succinate, polyvinyl pyridine, or sulfonic acid group-containing polyamide and a photocurable monomer.

(4) A mixture of a polymer, such as polyvinyl pyridine or sulfonic acid group-containing polyamide provided with photocurability, and a photocurable monomer.

(5) A mixture of a polymer, such as polyamide containing a salt of quaternary ammonium, and a photocurable monomer.

(6) A mixture of a polymer such as, polyamide containing a salt of quaternary ammonium which is provided with photocurability, and a photocurable monomer.

(7) A mixture of a polymer, such as cellulose nitrate, cellulose acetate butyrate, ethylene cellulose, acetyl cellulose which are provided with photocurability, and a photocurable monomer.

(8) A mixture of a polyfunctional polyester, such as polycaprolactone provided with photocurability, and a photocurable monomer.

(9) A mixture of a polymer, such as vinyl chloride-vinyl acetate-vinyl alcohol copolymer, vinyl chloride-vinyl alcohol copolymer, vinyl chloride-vinyl acetate-maleic acid copolymer, or vinyl chloride -vinyl propionate-vinyl alcohol copolymer which are provided with photocurability, and a photocurable monomer.

(10) A mixture of a polymer, such as butadiene polymer, styrene-butadiene copolymer, or acrylonitrile-butadiene copolymer having a hydroxyl group or carboxyl group at the terminals and provided with photocurability, and a photocurable monomer.

(11) A mixture of a polymer, obtained by adding α,β-ethylenically unsaturated mono-carboxylic acid to epoxylated diene polymer, and a photocurable monomer.

(12) A mixture of a polymer obtained by adding α,β-ethylenically unsaturated mono-carboxylic acid to the epoxy group of a polymer or copolymer of glycidyl acrylate or glycidyl methacrylate, and a photocurable monomer.

(13) A mixture of a copolymer of a conjugated diolefin hydrocarbon, α,β-ethylenically unsaturated carboxylic acid, and mono-olefin and a photocurable monomer.

(14) A mixture of a urethane (meth)acrylate oligomer and a photocurable monomer.

(15) A mixture of a (meth)acrylate oligomer of epoxy group-containing compound and a photocurable monomer.

Among these mixtures, a photosensitive resin composition comprising the mixture (14), which is a mixture of a urethane (meth)acrylate oligomer and a photocurable monomer, and the mixture (15), which is the mixture of a (meth)acrylate oligomer of epoxy group-containing compound and a photocurable monomer, are preferred.

Typical examples of the composition comprising the mixture (14) and photopolymerization initiators include a photocurable resin composition containing (i) urethane acrylate oligomer with a number average molecular weight of 1230 which is obtained from 2,4-tolylene diisocyanate, hydroxyethyl acrylate, and polyoxytetramethylene glycol (molecular weight: 650), (ii) urethane acrylate oligomer with a number average molecular weight of 406 which is obtained from 2,4-tolylene diisocyanate and hydroxyethyl acrylate, (iii) a diluent monomer component containing n-vinyl caprolactam and tricyclodecane-di-yl dimethylene acrylate, and (iv) 2-benzyl-2-dimethylamino-1-(4-morpholinophenyl)-butanone-1 and 1-hydroxycyclohexylphenyl ketone as photopolymerization initiators (SCR500™, manufactured by Japan Synthetic Co., Ltd.); and a photocurable resin composition containing (i) urethane acrylate oligomer obtained from isophorone diisocyanate, hydroxyethyl acrylate, and adipic acid-neopentyl glycol polyester polyol, (ii) diluent monomers comprising dimethacryloyl ethyl ether of bisphenol A, polyethylene glycol diacrylate, and neopentyl glycol dimethacrylate, and (iii) 2,2-dimethoxy-2-phenyl acetophenone and 1-hydroxycyclohexyl phenyl ketone, and 2,4,6-trimethylbenzoyldiphenylphosphine oxide as photopolymerization initiators.

A photosensitive resin composition comprising the mixture (15) and photopolymerization initiators is also preferred. Given as a typical example of this type of mixture is a photocurable resin composition comprising (i) an oligomer which contains diacrylate of bisphenol A diglycidyl ether, (ii) polyethylene glycol diacrylate as a photocurable monomer, and (iii) 2,2-dimethoxy-2-phenyl acetophenone sulfonim as a photocationic polymerization initiator.

In addition to the above components, fillers such as glass and alumina; coloring agents such as dies and pigments; surfactants; photosensitizers; preservatives; silane coupling agents (adhesive adjuvant); and the like maybe optionally added to the photosensitive resin composition of the present invention.

As clearly shown in the above-described embodiment, because the cured resin layer h(N+1) is always supported by the solid layer consisting of a coagulated resin layer (pn) and a previously cured resin layer (hn), the upper parts of an article consisting of two or more parts separated in the vertical direction can be molded in a desired shape without providing a linkage to support these upper parts. An article with an overhanging part can also be molded without using a supporting member without producing any deformation such as warping in the overhanging portion. In addition, because the photosensitive resin composition used is fluid at normal temperatures, uncured resin after optical molding can be removed with great ease as compared with a composition which is a solid or a film or a composition which is a gel at normal temperatures.

If the cutting step for cutting the surface of the coagulated resin layer, or for cutting the surface of the resin layer containing a cured resin, is carried out after the resin layer cooling step [B] or after the irradiation step [C], respectively, the lamination pitch of the cured resin layer making up the molded article can be reduced. This makes the optical molding process of the present invention adaptable for the manufacture of precision parts such as those of a micromachine.

The optical molding process of the present invention has been illustrated in the above description with reference to a typical embodiment. It should be understood that the embodiment was given for illustration of the invention and is not intended to be limiting thereof. In light of the above description numerous modifications and variations are possible in the optical molding process, as well as in the apparatus and the photosensitive resin composition.

<Experimental Example>

An experiment for producing a three-dimensional article was carried out using the optical molding apparatus with the configuration shown in FIG. 2.

(1) Designing the three-dimensional article image

Figure 7A:
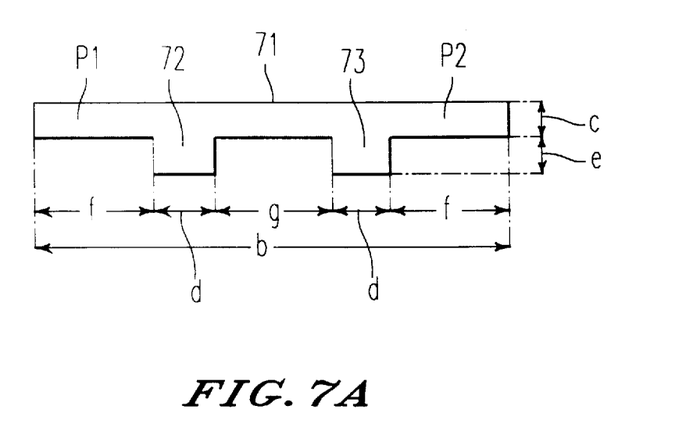
FIG. 7A is a front elevation and FIG. 7B is a plan of the article.
Figure 7B:
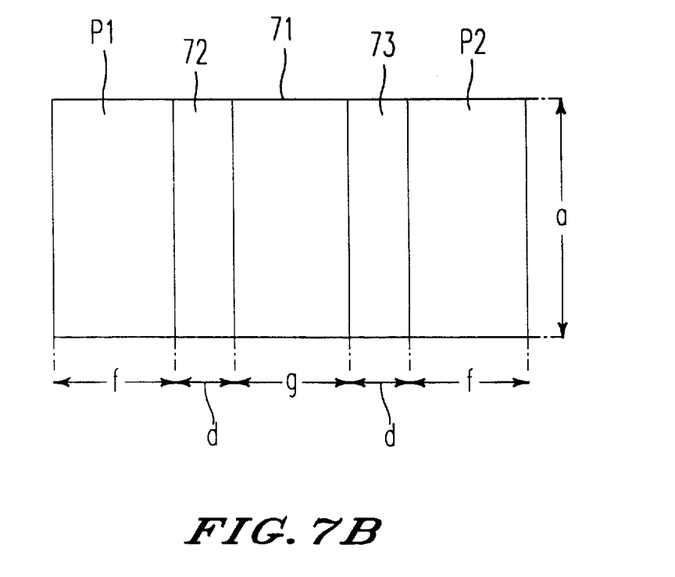

An image of a three-dimensional article consisting of a plate 71 and two feet 72, 73 with an identical shape, which has overhanging parts P1 and P2 at both ends of the plate, as shown in FIG. 7(A), was designed using a three-dimensional CAD system. Data for the shape of slices (slice shape data) was developed by horizontally cutting this three-dimensional article into 30 equal portions. The size of each portion of the three-dimensional article was as follows.

Plate 71: Length a=20 mm, Width b=40 mm, Height c=3 mm

Foot 72, 73: Width d=5 mm, Height e=3 mm

The length of the overhanging part P1, P2: f=10 mm

Interval between the feet 72 and 73: g=10 mm (2) Optical molding steps

Using a photocurable resin composition, SCR500™ (a product of Japan Synthetic Rubber Co., Ltd.), as the photosensitive resin composition, the resin supplying step [A], the resin layer cooling step [B], and the irradiation step [C] using a UV laser were repeated according to the slice-shape data developed as mentioned above, to produce the three-dimensional article consisting of 30 laminated layers of cured resin.

(3) Steps for melting and removal of the photosensitive resin and for washing

After completion of the optical molding steps, circulation of the cooling medium through the jacket in the resin container was terminated, thereby melting the photosensitive resin. The resin was then removed. The three-dimensional article was removed from the resin container and washed with a terpene-type glycol ester, then with ethanol.

(4) Post-cure treatment step

A post-cure treatment was carried out by irradiating the washed three-dimensional article with light from a mercury lamp for two hours.

The three-dimensional article thus obtained had no deformation such as warping in the overhanging parts and precisely reflected the image of the three-dimensional article designed by the three-dimensional CAD system with high dimensional accuracy.

<Comparative Experiment>

Figure 8:
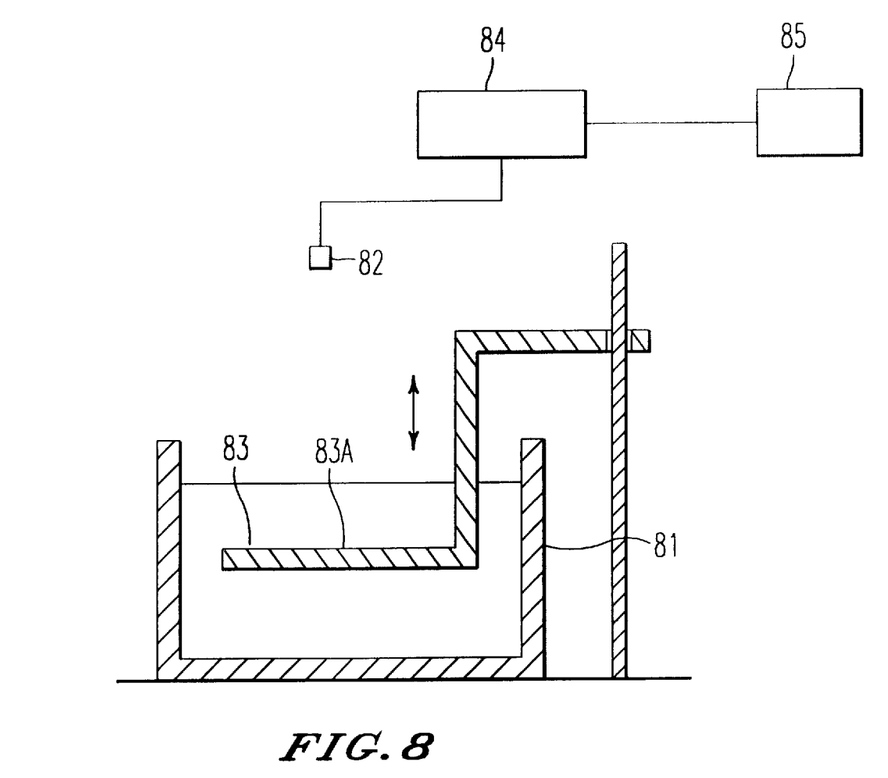
FIG. 8 shows an outline of the optical molding apparatus employing a free liquid surface method used in Comparative Experiment hereinafter.

An experiment for producing a three-dimensional article was carried out using the optical molding apparatus shown in FIG. 8, wherein numeral 81 indicates a resin container; 82, a UV laser irradiation source; 83, a supporting stage which can freely move vertically in the resin container 81; 84, a controller; and 85, a data file. The same photocurable resin composition, SCR500™ (a product of Japan Synthetic Rubber Co., Ltd.), was used as in the Experiment above.

The surface 83A of the supporting stage 83 was caused to sink below the surface of the liquid resin for a distance corresponding to the thickness of one layer of the resin according to the slice-shape data prepared in the Experimental Example above. The surface of this resin layer was selectively irradiated to produce a cured layer. A three-dimensional article consisting of 30 laminated layers of cured resin was produced by the free liquid surface method consisting of a repetition of the above procedure. The three-dimensional article thus obtained had insufficiently cured resin in overhanging parts which warped downward. The dimensional precision of this article with respect to that designed by the CAD system was low.

Various advantages of the optical molding process in the present invention are summarized below.

In the optical molding process of the present invention a resin layer n consists of a part of the resin coagulated (reversibly solidified) by cooling and another part of the resin cured (non-reversibly solidified) by irradiation, and a cured resin layer (n+1) is formed on the surface of this solid resin layer n. Thus, the cured resin layer (n+1) is always supported by the previously formed solid layers (layers 1 to n) without fail. As a result, an article with an overhanging portion can be molded by the process of the present invention without using any supporting member to sustain the overhanging portion. Because the molding process of the present invention ensures that the overhanging portion is adequately supported by the previously formed solid resin layers, the target article with no warp can be obtained without using a supporting member. In the same manner, an article consisting of two or more parts which are separated in the vertical direction can also be molded without providing a linkage for supporting the upper parts. The previously formed solid resin layers in the present invention can adequately support such upper portions to produce all parts which make up the target three-dimensional article. In addition, because the photosensitive resin composition used is fluid at normal temperatures, uncured resin after optical molding can be removed with great ease as compared with a composition which is a solid or a film or a composition which is a gel at normal temperatures.

The polymerization-curing reaction occurs by irradiating the photosensitive resin composition even if the resin is coagulated. Because the contraction rate of the coagulated resin during the polymerization-curing reaction is much smaller than that of liquid resin, three-dimensional articles with a high dimensional accuracy can be obtained.

A lamination pitch which is a unit of cured resin layer constituting a molded article can be reduced by providing the step for reducing the thickness of the resin layer by cutting the surface of a layer of coagulated photosensitive resin. This makes the process of the present invention adaptable to the manufacture of high precision parts such as in micro-machines.

Furthermore, the provision of the step for cutting both the surface of the coagulated photosensitive resin of the layer (N+1) and the surface of the cured photosensitive resin of the layer (n+1) can ensure reduction of the lamination pitch more reliably, enabling the process of the present invention to be adapted for the manufacture of high precision parts such as in micro-machines.

Obviously, numerous modifications and variations of the present invention are possible in light of the above teachings. It is therefore to be understood that, within the scope of the appended claims, the invention may be practiced otherwise than as specifically described herein.

What is claimed:

1. In the optical molding process for forming a three-dimensional article comprising the steps of forming a plurality of laminated cured resin layers by a repetition of the steps of forming a cured resin layer by selectively irradiating the surface of a layer of a normally fluid photosensitive resin composition, the improvement characterized by a repetitive step of cooling each layer of a normally fluid photosensitive resin composition which is coagulatable by cooling to cause it to coagulate prior to irradiation, then irradiating the coagulated resin composition with light.

2. The optical molding process according to claim 1, further comprising:

a step (A) for forming a layer (N+1) of a liquid photosensitive resin composition coagulatable by cooling by supplying the resin composition to the surface of a resin layer n consisting of cooled, coagulated photosensitive resin composition and to the adjacent surface of the cured resin layer n formed by irradiating at least a selected part of the layer n containing the coagulated photosensitive resin composition, a step (B) of cooling the photosensitive resin composition of the layer (n+1) to coagulate the resin, and a step (C) of selectively irradiating the surface of the coagulated photosensitive resin composition of the layer (N+1) to produce a cured resin layer (N+1).

3. The optical molding process according to claim 2, further comprising a step of cutting the surface of coagulated photosensitive resin of the layer (N+1) produced by the step (B) to reduce the thickness of the layer (n+1).

4. The optical molding process according to claim 2, further comprising a step of cutting the surface of coagulated photosensitive resin of the layer (N+1) and the surface of cured photosensitive resin of the layer (N+1) produced by the step (C) to reduce the thickness of these layers.

5. The optical molding process according to claim 1 comprising the subsequent steps, after completion of the steps of forming the plurality of laminated cured layers forming the three-dimensional article of (D) melting the coagulated cooled photosensitive resin that has not been cured by irradiation and (E) discharging the melted photosensitive resin from its position in contact with the three-dimensional article.

* * * * *